United States Patent [19]

Ikeda et al.

[11] 4,049,594
[45] Sept. 20, 1977

[54] PROCESS FOR PREPARING EXPANDABLE STYRENE POLYMER PARTICLES

[75] Inventors: Toshiki Ikeda, Shiga; Fumito Yamai, Kusatsu; Tomohiko Ishida, Shiga, all of Japan

[73] Assignee: Sekisui Kaseihin Kogyo Kabushiki Kaisha, Nara, Japan

[21] Appl. No.: 626,868

[22] Filed: Oct. 29, 1975

[30] Foreign Application Priority Data

Oct. 31, 1974 Japan ............................. 49-126187

[51] Int. Cl.$^2$ ............................................. C08J 9/18
[52] U.S. Cl. ............................. 260/2.5 B; 260/2.5 HB
[58] Field of Search ...................................... 260/2.5 B

[56] References Cited

U.S. PATENT DOCUMENTS

| 3,117,941 | 1/1964 | Knoblock et al. ............... 260/2.5 B |
| 3,558,534 | 1/1971 | Niechwiadowicz et al. ..... 260/2.5 B |

OTHER PUBLICATIONS

"Smith's College Chemistry", by Wm. Ehret, p. 519.
"Polymerization of Olefins and Diolefins in Suspension and Emulsion Part I", by Hohenstein et al., J.P.O.S., Jan. 16, 1946, pp. 127-145.

*Primary Examiner*—Morton Foelak
*Attorney, Agent, or Firm*—Armstrong, Nikaido & Marmelstein

[57] ABSTRACT

A process for preparing expandable styrene polymer particles by using magnesium oxide as a suspending agent to prevent agglomeration of styrene polymer particles during impregnation with an expanding agent. The process comprises preparing expandable styrene polymer particles from styrene polymer particles in water, wherein the expanding agent (which does not dissolve styrene polymer particles or slightly swells the particles, and has a boiling point lower than the softening point of the particles) is added in the presence of the suspending agent and the particles being impregnated thereby.

8 Claims, No Drawings

PROCESS FOR PREPARING EXPANDABLE STYRENE POLYMER PARTICLES

BACKGROUND OF THE INVENTION

Expandable styrene polymer particles are conventionally prepared by means of a process of dispersing styrene polymer particles in water to form a suspension, wherein an expanding agent is then added to impregnate the particles as disclosed in the specifications of U.S. Pat. No. 2,893,963 and No. 2,950,261. However, there has been a tendency of such particles, during impregnation, to agglomerate to stick together to form large lumps, because of the solvent action of the expanding agent during the impregnation of the polymer particles with the expanding agent.

In order to prevent agglomeration, suspending agents are generally used. As suspending agents, the following compounds are well known, for example, partially saponified polyvinylalcohol, polyacrylate, polymethacrylate, polyvinylpyrrolidone, carboxymethyl cellulose, ethyl cellulose, methyl cellulose and sodium alginate which are water-soluble organic compounds having protective colloidal properties. The above compounds are generally used together with surface active agents or sodium pyrophosphate and the like in order to increase their suspension activity.

There is a tendency, however, to produce agglomerated particles when using the above-described water-soluble organic compounds at a higher temperatures, and it is necessary to carefully and continuously add the expanding agent in parts or a little at a time when using an expanding agent such as n-pentane which is in liquid form at ordinary conditions, e.g., room temperature and atmospheric pressure. Such restrictions in the impregnation step are disadvantageous, since they cause lower productivity. Furthermore, this present environmental problems, since it is very difficult to dispose of the waste water after impregnation.

Suspending agents are disclosed in the specifications of U.S. Pat. No. 2,983,692, Great Britain Pat. No. 1,202,833: e.g. slightly water-soluble, fine powders of inorganic substances such as tertiary calcium phosphate, magnesium pyrophosphate, calcium carbonate, calcium silicate and bentonite, metal salts of an aliphatic acid such as calcium stearate and zinc stearate, and organic fine powders such as the bis-amide of an aliphatic acid, for example, ethylene-bis-stearoamide, etc. However, the above-mentioned suspending agents are not economical, since each of the above-mentioned suspending agents must be used in large quantities, i.e. no less than 1% by weight of styrene polymer particles, when used alone, in order to prevent the agglomeration of the polymer particles caused by the expanding agent and/or softening agent.

Therefore, a method has been generally adopted of using the fine powders in combination with a surface active agent in order to increase the suspension activity. For example, U.S. Pat. No. 2,687,408, U.S. Pat. No. 2,715,118 and U.S. Pat. No. 2,983,692 show that good results were obtained by using anionic surface active agents with inorganic fine powders. Especially stable suspension activity was obtained by using smaller amounts of a suspending agent consisting of phosphates or pyrophosphates, such as tertiary calcium phosphate, hydroxyapatite and magnesium pyrophosphate in combination with a small quantity of sodium dodecylbenzenesulfonate or sodium laurylalcohol-sulfate ester. When using organic fine powders such as calcium stearate and ethylene-bis-amide, not only may anionic surface active agents be used, but also nonionic and amphoteric surface active agents may be used in order to increase the suspension activity. However, such suspending agents are generally not excellent agents.

Surface active agents have been used in combination with slightly water-soluble, fine powders as suspending agents in order to increase the suspension activity. However, it is very difficult to recover and/or release the expanding agent after the impregnation step, due to the vigorous foaming caused by the remaining expanding agent when using a surface active agent and an expanding agent such as propane or butane. It is necessary, therefore, to use an anti-foam agent in order to reduce the amount of foam. It is also difficult to completely remove the waste water containing the surface active agent by ordinary equipment used for treating waste water.

Inorganic compounds including phosphorus, such as phosphate or pyrophosphate, become one of the nutritive substances when discharged into a river or lake and such discharging will be limited by means of the present invention to protect the environment in the future.

After inventigating a process for improving the above processes, the inventors of the present invention have found that excellent suspension stability is obtained by using a small amount of magnesium oxide as the suspending agent, without the need of using it in combination with surface active agents.

SUMMARY OF THE INVENTION

Expandable styrene polymer particles are produced having excellent suspension stability by using magnesium oxide as the suspending agent. The process comprises the steps of dispersing styrene polymer particles in water and adding thereto, and in the presence of a suspending agent, an expanding agent which does not dissolve the particles or slightly swells the particles, and has a boiling point lower than the softening point of the polymer particles and is gaseous or liquid at ordinary conditions.

DETAILED DESCRIPTION OF THE INVENTION

The present invention relates to a process for the production of expandable styrene polymer particles which comprises using magnesium oxide as the suspending agent in a process which comprises dispersing styrene polymer particles in water and adding thereto an expanding agent.

According to the present invention, it is sufficient to use only magnesium oxide as the suspending agent. In the step of removing or releasing the remaining expanding agent after impregnation of the styrene polymer particles, the forming of foam is not observed in the present invention, while heretofore vigorous foaming was observed when surface active agents and/or water soluble organic compounds were used. The process of the present invention, therefore, is a superior process from the commercial point of view. The process of the present invention provides advantages for the treatment of waste water, since magnesium oxide is neutralized with hydrochloric acid to produce water-soluble magnesium chloride which is easily removed from the system. Therefore, the procedure for treating waste water is less complicated in comparison with procedures using surface active agents and/or water-soluble organic compounds having protective colloidal properties. Fine powders of magnesium oxide suitable for use in the present invention have a particle size of 0.1 – 10 μ and, particularly, fine powders containing particles having size smaller than 5 μ in an amount of more than 50% of the powders are suitable. Magnesium oxide is generally produced by burning of magnesium hydroxide or magnesium carbonate. In this case, magnesium oxide prepared from hexagonal magnesium hydroxide crystals are particularly suitable as suspending agents.

Generally, the amount of magnesium oxide to be used is in the range of from about 0.2 to about 1.0 weight % based on the polymer particles. The amount of magnesium oxide, however, may be varied depending on the size of the polymer particles to be used, ratio of polymer particles and water, kind of expanding agent and other additives. Where magnesium oxide is used in an amount of less than 0.2 weight %, there is a tendency to cause agglomeration of the polymer particles, and where it is used in an amount of more than 1 weight %, it is not economical, since further advantages are not obtained.

It is possible to add an expanding agent in the reaction system over a wide range of temperatures, for example, from ordinary temperatures, or from about 20° C to about 130° C, and preferably from about 80° to about 130° C when magnesium oxide is used as the suspending agent. It is not advisable to add an expanding agent to the reaction system at temperatures over 140° C, from an economic standpoint, since a high pressure system is needed. In the case of using an expanding agent such as n-pentane which is a liquid at room temperature, it is preferable to add such expanding agent at lower temperatures and increase to temperatures above 90° C to achieve impregnation, since it is possible to obtain stable impregnation of the polymer particles without causing agglomeration. In the case of adding n-pentane in the reaction system at temperatures above 100° C, it is possible to impregnate without causing agglomeration by feeding n-pentane incrementally according to the speed of absorption of n-pentane into the polymer particles.

Steps for the production and operation of the present invention are very simplified as it is sufficient to use only magnesium oxide as the suspending agent to obtain desirable results and it is not necessary to use magnesium oxide in combination with organic or inorganic fine powders, surface active agents or organic compounds having protective colloidal properties.

It was found that magnesium oxide is an especially effective suspending agent in impregnating an expanding agent on a stable level without producing agglomerated polymer particles, when it is used for polymer particles having small particle diameters such as from about 0.5 to about 0.2 mm.

Styrene polymer particles which may be used in the present invention include: styrene polymer particles prepared by the polymerization of vinyl aromatic monomers including styrene, vinyltoluene, isopropylstyrene, alpha-methylstyrene, nuclear methylstyrene, chlorostyrene, tert-butylstyrene, etc.; styrene copolymer particles prepared by the copolymerization of a styrene monomer with monomers such as 1,3-butadiene, alkyl acrylates (for example, butyl acrylate, ethyl acrylate and 2-ethylhexyl acrylate), alkyl methacrylates (for example, methyl methacrylate, ethyl methacrylate, butyl methacrylate and 2-ethylhexyl methacrylate), acrylonitrile, vinyl acetate, alpha-methylethylene, divinyl benzene, dimethyl maleate and diethyl maleate, wherein the styrene monomer is present in an amount of at least about 50% by weight based on the copolymer.

Styrene polymer particles can, of course, be produced by any of the known techniques, for example by suspension or mass polymerization, to obtain particles in the form of beads or pellets. Such polymer particles have an average particle diameter of from about 0.2 to about 6 mm.

The polymer particles are dispersed in water, the amount of water being 0.7 – 5 times, and preferably 0.8 – 2 times the weight of the polymer particles employed.

The expanding agents employed in the present invention include those (1) which do not dissolve the styrene polymer particles, or slightly swells the polymer particles, (2) which have a boiling point lower than the softening point of the above described polymer and (3) which are gaseous or liquid at ordinary conditions. Such expanding agents are disclosed in the specifications of U.S. Pat. No. 2,983,692 and U.S. Pat. No. 2,893,963. Examples of such suitable expanding agents include aliphatic hydrocarbons having from 1 to 6 carbon atoms and preferably from 3 to 5 carbon atoms and a boiling point in the range of from about −42° C to about 36° C. Expanding agents suitable for use in the invention include propane, n-butane, isobutane, n-pentane, neo-pentane, isopentane and n-hexane; cycloaliphatic hydrocarbons such as cyclopentane, cyclohexane, etc., and halogenated hydrocarbons such as methyl chloride, ethyl chloride, dichloridifluoromethane, chlorodifluoromethane and trichlorofluoromethane. These expanding agents are impregnated into the polymer particles in an amount of from about 3% to about 15% by weight of the styrene polymer particles.

Flame retardants such as tris(2,3-dibromopropyl)-phosphate, tribromophenylallyl ether and hexabromocyclododecane, and auxiliary agents for flame retardants such as organic peroxide may also be used in this invention. Dyestuffs, antistatic agents, etc. may also be used.

The following examples are given to further illustrate the invention, and are not intended to limit the scope thereof.

EXAMPLE 1

2,200 g of water and 6.6 g of magnesium oxide (suspending agent) were placed into a 5.6 l autoclave. The magnesium oxide used in this example has the following analytical data:
MgO 97.5%
CaO 0.5%
Apparent density (Ml/10 g): 39
Absorption quantity of iodine mg/g: 16
Distribution of particles:
3 μ > (%): 59.3
3 – 6 μ (%): 33.1
6 – 10 μ (%): 5.5
10 – 15 μ (%): 1.6
15 μ (%) 0

To this mixture, 2,200 g of styrene polymer particles having a particle diameter size of 1.0 – 0.6 mm were added. After the autoclave was made air-tight and the mixture stirred at the speed of 320 rpm, 220 g of n-pentane as the expanding agent were added under pressure after the temperature was increased to 115° C. After impregnation for 2 hours at 115° C, the mixture was cooled to 30° C., removed from the reactor, acidified with hydrochloric acid to decompose the suspending agent, washed with water and dried. The product of expandable styrene polymer particles showed no agglomerated particles.

After ageing for 1 week, the polymer particles were pre-expanded by steam to particles having a density of 0.02 g/cc. Good cellular shaped articles were obtained on the next day by molding the pre-expanded polymer particles in a mole with steam.

EXAMPLE 2

2,200 g of water and 11 g of magnesium oxide, as described in Example 1, were placed in a 5.6 l autoclave, and to this mixture, 2,200 g of styrene polymer particles having a particle diameter size of 0.4 –0.25 mm were added. After the autoclave was made air-tight and the mixture was stirred at the speed of 320 rpm, 176 g of n-pentane as the expanding agent were added after the temperature was raised to 115° C. After impregnating for 30 minutes at 115° C, the mixture was cooled to 30° C, and removed from the reactor. The suspension medium was acidified with hydrochloric acid to a pH of 3 to decompose the suspending agent, and the expandable polymer particles were washed with water and dried. Expandable styrene polymer particles having a small diameter were obtained.

After ageing for 4 days, the expandable styrene polymer particles were expanded by steam to form pre-expanded particles having a density of 0.083 g/cc. The resulting pre-expanded styrene polymer particles were fed into a cup mold cavity having a diameter of 95 mm in the upper part, 70 mm in diameter at the bottom and 105 mm in height and heated by steam. A good cellular, shaped cup was obtained.

EXAMPLE 3

2,200 of water and 6.6 g of magnesium oxide, as described in Example 1, were added to a 5.6 l autoclave and then 2,200 g of styrene-butyl acrylate copolymer, which consists of 98 parts of styrene and 2 parts of butyl acrylate and having a 1.0 – 0.6 mm diameter were added. After the autoclave was made air-tight and while the mixture was stirred at the speed of 320 rpm, the temperature was increased to 80° C. While maintaining this temperature, 220 g of n-butane were added as the expanding agent. After impregnation at 80° C for 6 hours, the mixture was cooled to 30° C, and the remaining gas was released from a relief valve. Blocking of the valve by foam was not observed in this case, and the remaining gas was easily released.

The expandable polymer particles were removed from the reactor and treated with hydrochloric acid, washed with water and dried. Expandable styrene-butyl acrylate copolymer particles having no agglomerated particles were obtained.

COMPARATIVE EXAMPLE 1

As a comparison with the results of Example 3, the procedure of Example 3 was substantially repeated except that 17.6 g of calcium phosphate and 0.33 g of dodecylbenzene sulfonate were used instead of magnesium oxide. After adding n-butane, the mixture was cooled to 30° C. It was observed that only a little amount of the remaining expanding agent could be released, and ⅔ of the remaining expanding agent could not be released through the valve due to blocking of the valve caused by foaming of the mixture employed as the suspending agent.

EXAMPLE 4

2,200 g of water and 11 g of magnesium oxide as described in Example 1 were added to a 5.6 l autoclave and then 2,200 g of styrene polymer particles having a diameter of 1.0 – 0.6 mm were added. To this mixture, 27 g of tribromophenylallyl ether were added as a flame retarding agent while stirring at a speed of 320 rpm. After the autoclave was made air-tight and the temperature was elevated to 115° C, 176 g of n-pentane (expanding agent) were added. After impregnating for 4 hours at 115° C, the mixture was cooled to 30° C and removed from the reactor and the suspension medium was acidified with hydrochloric acid to a pH of 3 to decompose the suspending agent, washed with water and dried. Flame retardant expandable styrene polymer particles were obtained. The obtained polymer particles showed no agglomerated particles.

After ageing for 1 week, the polymer particles were pre-expanded by steam to particles having a density of 0.02 g/cc. Good cellular shaped articles were obtained on the next day by molding the pre-expanded polymer particles in a mold with steam. Test results of the cellular shaped articles as to self-extinguishing properties according to JIS-A9511 showed that the articles self-extinguished in about 1.2 seconds in average time, and, according to UL-94, showed that the cellular shaped articles correspond to HEF No. 1, and, therefore, the cellular shaped articles have excellent self-extinguishing properties.

EXAMPLE 5

The procedure of Example 1 was substantially repeated except that styrene-ethyl methacrylate copolymer particles which consist of 90 parts of styrene and 10 parts of ethyl methacrylate were used instead of styrene polymer particles. It was observed that no agglomerated particles were present in the expandable copolymer particles. It was found that the expanding speed of the copolymer particles is more rapid than that of styrene polymer particles in the pre-expanding step.

EXAMPLE 6

The procedure of Example 1 was substantially repeated except that cross-linked styrene-divinylbenzene copolymer particles consisting of 99.98 parts of styrene and 0.02 parts by divinylbenzene were used instead of styrene polymer particles. The resulting expandable copolymer particles showed no agglomerated particles. It was found that the expanding speed of the copolymer particles is slow and that the copolymer particles have good thermal properties in the molding step.

EXAMPLE 7

2,200 g of water and 6.6 g of magnesium oxide as described in Example 1 were added to a 5.6 l autoclave and then 2,200 g of styrene polymer particles having an average particle size of 0.63 – 0.5 mm in diameter were added. After the autoclave was made air-tight, the mixture, was stirred at a speed of 320 rpm. Then, the temperature was increased to 130° C. While maintaining this temperature, 176 g of n-pentane were added as the expanding agent. After impregnating for 30 minutes at 130° C, the mixture was cooled to 30° C, and removed from the reactor. The suspension medium was acidified with hydrochloric acid to a pH of 3 to decompose magnesium oxide, and then the expandable polymer particles were washed with water and dried.

After ageing for 4 days, the expandable styrene polymer particles were expanded by steam to form pre-expanded particles having a density of 0.083 g/cc.

The resulting pre-expanded styrene polymer particles were fed into the mold cavity described in Example 2 and heated by steam. A good cellular shaped cup was obtained.

What is claimed is:

1. In a process for preparing expandable styrene polymer particles wherein styrene polymer particles are dispersed in water in the presence of a suspending agent and an expanding agent is added to the suspension to impregnate the particles, the improvement comprising employing magnesium oxide in an amount from about 0.2 to about 1.0% by weight of the polymer particles as the suspending agent.

2. The process of claim 1, wherein the styrene polymer particles are polymer particles prepared by the polymerization of a vinyl aromatic monomer selected from the group consisting of styrene, vinyltoluene, isopropylstyrene, alpha-methylstyrene, nuclear methylstyrene, chlorostyrene and tertiary-butylstyrene.

3. The process of claim 1, wherein the styrene polymer particles are styrene copolymer particles prepared by the copolymerization of a styrene monomer and a monomer selected from the group consisting of 1,3-butadiene, alkyl acrylate, alkyl methacrylate, acrylonitrile, vinyl acetate, alpha-methylethylene, vinyl benzene and dialkyl maleate, wherein the styrene monomer is present in an amount of at least about 50% by weight of the copolymer.

4. The process of claim 1, wherein the expanding agent is a hydrocarbon selected from the group consisting of propane, n-butane, isobutane, n-pentane, neo-pentane, isopentane, n-hexane, cyclopentane and cyclohexane.

5. The process of claim 1, wherein the expanding agent is a halogenated hydrocarbon selected from the group consisting of methyl chloride, ethyl chloride, dichlorodifluoromethane, chlorodifluoromethane and trichlorofluoromethane.

6. The process of claim 4, wherein said expanding agent is used in an amount from about 3 to about 15% by weight of the styrene polymer particles.

7. The process of claim 1, wherein the styrene polymer particles have a particle size of from about 0.5 to about 0.2 mm in diameter.

8. The process of claim 1, wherein the expanding agent is impregnated at a temperature of from about 80° C to about 130° C.

* * * * *